United States Patent
Frenier et al.

(10) Patent No.: US 8,312,929 B2
(45) Date of Patent: *Nov. 20, 2012

(54) METHOD FOR SINGLE-STAGE TREATMENT OF SILICEOUS SUBTERRANEAN FORMATIONS

(75) Inventors: Wayne W. Frenier, Tulsa, OK (US); Diankui Fu, Tyumen (RU); Stephen Nigel Davies, Doha (QA); Murtaza Ziauddin, Abu Dhabi (UA); Zhijun Xiao, Sugar Land, TX (US); Bruno Lecerf, Novosibirsk (RU); Helene Bulte, Viroflay (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 614 days.

This patent is subject to a terminal disclaimer.

(21) Appl. No.: 12/019,394

(22) Filed: Jan. 24, 2008

(65) Prior Publication Data

US 2009/0192054 A1 Jul. 30, 2009

(51) Int. Cl.
*E21B 43/28* (2006.01)
(52) U.S. Cl. ............... 166/305.1; 166/300; 166/307; 507/238; 507/267; 507/277
(58) Field of Classification Search .......... 252/397; 507/241, 238, 267, 277; 166/305.1, 300, 166/307
See application file for complete search history.

(56) References Cited

U.S. PATENT DOCUMENTS

| | | |
|---|---|---|
| 4,090,563 A | 5/1978 | Lyarger |
| 4,646,835 A | 3/1987 | Watkins |
| 6,436,880 B1 | 8/2002 | Frenier |
| 6,506,711 B1 | 1/2003 | Shuchart |
| 6,521,028 B1 | 2/2003 | Frenier |
| 6,531,427 B1 | 3/2003 | Shuchart |
| 6,806,236 B2 | 10/2004 | Frenier |
| 7,114,567 B2 | 10/2006 | Chan |
| 7,192,908 B2 | 3/2007 | Frenier |
| 7,299,870 B2 | 11/2007 | Chan |
| 7,306,041 B2 | 12/2007 | Milne et al. |
| 2002/0070022 A1 | 6/2002 | Chang |
| 2002/0104657 A1 | 8/2002 | Frenier |
| 2002/0170715 A1 | 11/2002 | Frenier |

(Continued)

FOREIGN PATENT DOCUMENTS

WO 0070186 11/2000

(Continued)

OTHER PUBLICATIONS

R.F. Scheuerman, A Buffer-Regulated HF Acid for Sandstone Acidizing to 550° F, SPE 13563, Feb. 1988.

(Continued)

*Primary Examiner* — Mark Kopec
*Assistant Examiner* — Haidung Nguyen
(74) *Attorney, Agent, or Firm* — Michael Dae; Daryl Wright; Robin Nava (57) ABSTRACT

In a method of treating a sandstone-containing formation penetrated by a wellbore, a treatment fluid comprising an aqueous fluid containing a Bronsted acid, a hydrogen fluoride source and an organic acid or salt thereof that is substantially soluble in the aqueous fluid is formed. The treatment fluid contains less than about 2% of fluoride ($F^-$) by weight of the fluid and from 2% or less of sodium ($Na^+$) by weight of the fluid. The treatment fluid is introduced into the formation through the wellbore as a single-stage without introducing an acid-containing fluid preflush into the formation prior to introducing the treatment fluid.

18 Claims, 4 Drawing Sheets

U.S. PATENT DOCUMENTS

| | | |
|---|---|---|
| 2005/0137095 A1 | 6/2005 | Cawiezel |
| 2006/0118302 A1 | 6/2006 | Fuller |
| 2006/0131022 A1 | 6/2006 | Rae |
| 2009/0042748 A1 | 2/2009 | Fuller |

FOREIGN PATENT DOCUMENTS

| | | |
|---|---|---|
| WO | 03029613 | 4/2003 |
| WO | 2004094557 | 11/2004 |
| WO | 2008068657 | 6/2008 |

OTHER PUBLICATIONS

T. Huang, P.M. Mcelfresh, A.D. Gabrysch, Acid Removal of Scale and Fines at High Temperatures, SPE 74678, Jan. 2002, Aberdeen, United Kingdom.

J.S. Rhudy, Removal of Mineral from Reservoir Core by Scale Dissolver, SPE 25161, Mar. 1993, New Orleans, USA.

C.M. Shaughnessy, W.E. Kline, EDTA Removes Formation Damage at Prudhoe Bay, SPE 11188, Oct. 1983.

Wayne Frenier, David Wilson, Use of Highly Acid-Soluble Chelating Agents in Well Stimulation Services, SPE 63242, Oct. 2000, Dallas, USA.

Wayne Frenier, Novel Scale Removers are Developed for Dissolving Alkaline Earth Deposits, SPE 65027, Feb. 2001, Houston, USA.

W.W. Frenier, C.N. Fredd, F. Chang, Hydroxyaminocarboxylic Acids Produce Superior Formulations for Matrix Stimulation of Carbonates, SPE 68924, May 2001, The Hauge, The Netherlands.

C.N. Fredd, H.S.Fogler, The Influence of Chelating Agents on the Kinetics of Calcite Dissolution, Journal of Colloid and Interface Science, 204, pp. 187-197, 1998, Michigan, USA.

C.N. Fredd, H.S. Fogler, Influence of Transport and Reaction on Wormhole Formation in Porous Media, AIChE Journal, vol. 44, pp. 1933-1949, Sep. 1998, Michigan, USA.

C.N. Fredd, H.S. Fogler, The Kinetics of Calcite Dissolution in Acetic Acid Solutions, Chemical Engineering Science, vol. 53, No. 22. pp. 3863-3874, 1998, Michigan, USA.

METHOD FOR SINGLE-STAGE TREATMENT OF SILICEOUS SUBTERRANEAN FORMATIONS

BACKGROUND

The statements in this section merely provide background information related to the present disclosure and may not constitute prior art. Various methods may be used to enhance the productivity of fluids from wells formed in subterranean formation, such as hydrocarbon-producing wells that produce oil or gas. Different characteristics or properties of the wells may limit the production of fluids. These may include insufficient flow paths in the formation, wellbore coatings and near-wellbore formation damage resulting from prior treatments or operations, such as from drilling fluids and the like, that limit fluid flow.

One method of treating such wells to enhance production involves the use of acids or acid-based fluids for dissolving portions of the formation to create alternate flow paths and for removing wellbore coatings and near-wellbore formation damage. Such acids or acid-based fluids are useful for this purpose due to their ability to dissolve both formation minerals and contaminants, such as those that were introduced into the wellbore/formation during drilling or remedial operations and which may coat the wellbore or have penetrated the formation. In the case of treatments within the formation, rather than wellbore treatments, the portion of the formation that is near the wellbore and that first contacts the acid is usually adequately treated. Portions of the formation further from the wellbore, however, may remain untreated by the acid, due to the acid reacting before it can penetrate very far from the wellbore.

Carbonate formations and materials are well suited for treatment with acids because they readily dissolve in a variety of different acids. Sandstone or siliceous formations or materials, however, are only susceptible to dissolution in hydrofluoric (HF) acid. Thus, sandstone formations are often treated with a mixture of hydrofluoric and hydrochloric acids (called mud acid). This acid mixture is often selected because it will dissolve clays (found in drilling mud) as well as the primary constituents of naturally occurring sandstones (e.g., silica, feldspar, and calcareous material). Such treatments may be carried out at low injection rates to avoid fracturing the formation.

A major problem with sandstone acidizing as presently practiced is that multiple stages are required to prevent deleterious reactions between components of the formation or dissolved materials and the acidizing fluids. Of particular concern is contact between dissolved calcium ions and fluoride ions that can produce a solid fluorite ($CaF_2$) that can partially negate the effectiveness of the treatment.

Chelating agents can be used to keep calcium and other metal ions in solution to prevent precipitation of these solid compounds. The chelating agents may have limited solubility, however, in low pH fluids. This presents a particular problem as a higher pH may make the acidizing fluid less effective.

Figure 1:
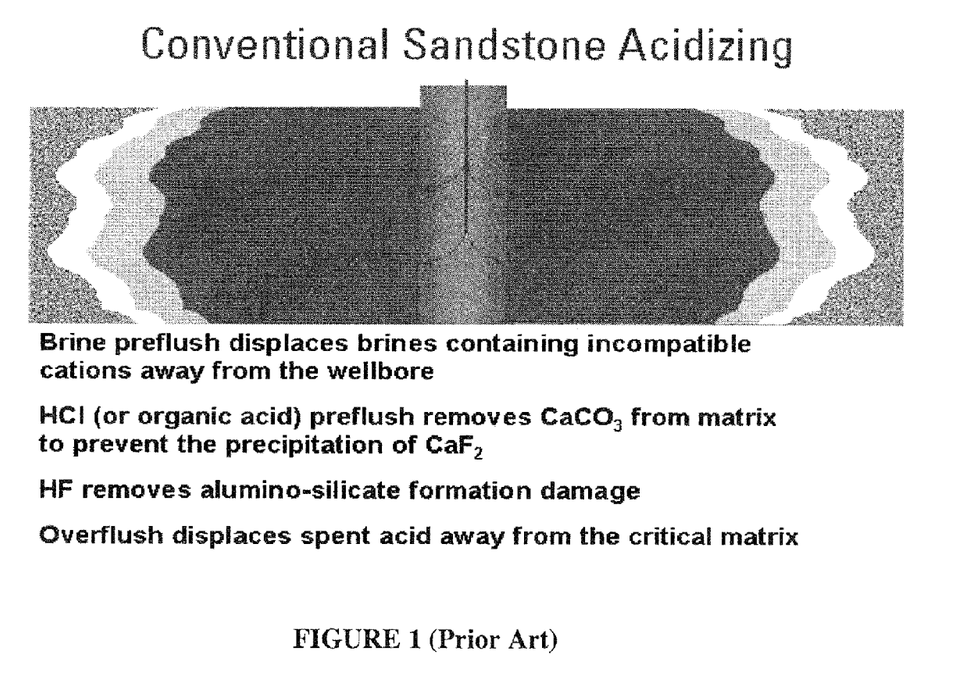
FIG. 1 is a schematic illustrating a prior art multiple stage sandstone acidizing treatment.

Because of these problems, several stages of fluids are typically required in acid treatment of sandstone formations. These stages include 1) a brine stage (e.g. KCl or $NH_4Cl$) to displace incompatible cations, such as $Ca^{2+}$ and $Na^+$ ions, away from the wellbore; 2) an acid stage (e.g. HCl, organic acid, etc.) to dissolve or remove the calcium or magnesium carbonate in the zone to prevent precipitation of $CaF_2$; 3) a primary silicate dissolution stage (e.g. HF+HCl or an organic acid) to remove alumino-silicates; and 4) a final brine stage to displace the dissolved ions and spent acids away from the critical matrix. FIG. 1 illustrates a prior art multiple stage treatment. In particular, the calcium removal stage and the silicate dissolution stages both alter the permeability of the matrix and thus affect the injection of subsequent fluids.

Because placement and proper diversion facilitate successful treatment of the formation, having multiple stages may make optimal placement difficult, as each stage may ultimately be positioned differently. What is therefore needed is a means for effectively treating sandstone or siliceous formations or materials with acid or acid-based solutions that reduces the amount of precipitates formed, in particular $CaF_2$ precipitates, and that eliminates the need for multiple steps and treatments, which can result in improper placement and inadequate treatment.

BRIEF DESCRIPTION OF THE DRAWINGS

For a more complete understanding of the present invention, and the advantages thereof, reference is now made to the following descriptions taken in conjunction with the accompanying figures, in which.

SUMMARY

In a method of treating a sandstone-containing formation penetrated by a wellbore, a treatment fluid comprising an aqueous fluid containing a Bronsted acid, a hydrogen fluoride source and an organic acid or salt thereof that is substantially soluble in the aqueous fluid is formed. The treatment fluid contains less than about 2% of fluoride ($F^-$) by weight of the fluid and from 2% or less of sodium ($Na^+$) by weight of the fluid. The treatment fluid is introduced into the formation through the wellbore as a single-stage without introducing an acid-containing or brine-containing fluid preflush into the formation prior to introducing the treatment fluid.

In certain embodiments, the combination of the Bronsted acid and organic acid or salt thereof may be present in the treatment fluid in an amount sufficient to keep at least 5000 ppm $Ca^{2+}$ in solution. The organic acid or salt thereof may be present in an amount of from about 5 to about 40% by weight of the treatment fluid and may be an ammoniated chelate.

In some embodiments, the treatment fluid may have a pH of about 3 or less and may be used at a temperature of from about 200° C. or less.

DETAILED DESCRIPTION

At the outset, it should be noted that in the development of any such actual embodiment, numerous implementation— specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

In the present invention, by providing a precise balance of components, a method of treating sandstone or siliceous formations may be effectively carried out in a single-stage. The single-state treatments overcome the limitations of prior art treatments that require multiple stages because the different stages are not always consistently placed. Thus, one stage may locate in one portion of the matrix and another stage may locate in a different portion of the matrix. As a result, the matrix may not receive sufficient volumes of each fluid stage for effective treatment.

The treatment fluid used in the method is formed from an aqueous fluid containing a combination of a hydrogen fluoride source, a proton donor or Bronsted acid and an organic acid or salt thereof that may act as a chelating agent that has substantial solubility in the Bronsted acid solution. As used herein, a Bronsted acid is any compound having the formula $AH=A^-+H^+$ when added to water. By the careful selection of these components, the calcium- and silicate-dissolving fluids may be combined in a single stage to dissolve both calcium carbonate as well as siliceous materials. These may include the aluminosilicates, such as clay, feldspar and formation fines. This allows the brine stages that are typically used in acid treating of wells of sandstone formations to be eliminated.

Depending upon the temperatures of use different treatment fluids may be used. For downhole temperatures of from about 100° C. to about 200° C., the treatment fluid may make use of ammoniated chelating agents that have high solubility at low pH or at a pH of about 4 or above, and facilitate maintaining calcium ions ($Ca^{2+}$) in solution. The ammoniated chelants may include certain aminopolycarboxylate and polyaminopolycarboxylate compounds that have substantial solubility in aqueous fluids having a pH of about 4 or more under the conditions of use. In particular, these may include the ammonium salts of these compounds. The ammonium salts of di-, tri- and tetra-aminopolycarboxylates are particularly useful in the present invention. The ammonium salts of these compounds exhibit higher solubilities at low pH than do their acid counterparts, particularly at lower temperatures. Examples of suitable organic acids or organic acid salts of the present invention are free-acids or partial-ammonium salts of ethylenediamine tetraacetic acid (EDTA), hydroxyethyl ethylenediamine triacetic acid (HEDTA), diethylene triamine pentaacetic acid (DTPA) and 2-hydroxyethyl iminodiacetic acid (HEIDA).

At lower temperatures of 125° C. or less, there is typically not enough reactivity to adequately dissolve the formation matrix at pH's higher than above about 3. At these temperatures, the treating fluid is formulated as a mud acid in combination with an organic acid or salt thereof that may act as a chelating agent and that is soluble in the mud acid solution. This allows a lower pH of from about 4 or less, more particularly, from about 3 or less, to be used. This allows the use of more aggressive HF acids to be used, particularly at lower temperatures.

The mud acid may be a mixture of hydrofluoric acid or hydrofluoric acid source and hydrochloric acid or an organic acid. This may include mixtures of different acids. Such mixtures or solutions employing hydrofluoric acid and at least one other acid are commonly referred to as "mud acids" and are well known to those skilled in the art. The non-HF acids used may include, but are not limited to, hydrochloric acid, hydroiodic acid, hydrobromic acid, sulfuric acid, sulfamic acid, phosphoric acid, formic acid, acetic acid, halogenated derivatives of acetic acid, citric acid, propionic acid, tartaric acid, lactic acid, glycolic acid, aminopolycarboxylic acids, sulfamic acid, methanesulfonic acid, malic acid, maleic acid, succinic acid, oxalic acid, methylsulfamic acid, chloroacetic acid, 3-hydroxypropionic acid, polyaminopolycarboxylic acid, polycarboxylates such as poly(acrylic acid), poly(maleic acid) and their copolymers, bisulfate salts and combinations of these. In mud acids, the HF may be present in the treatment fluid in an amount to provide less than 2% by weight of fluoride. The other acid, such as HCl, may be present in the aqueous solution in an amount of from about 3 to about 25% by weight of the solution.

In such low pH or mud acid treatment solutions, the acid soluble organic acids or organic acid salts may include ethylenediamine tetraacetic acid (EDTA), hydroxyethyl ethylenediamine triacetic acid (HEDTA), diethylene triamine pentaacetic acid (DTPA), 2-hydroxyethyl iminodiacetic acid (HEIDA), citric acid, tartaric acid, succinic acid, lactic acid, oxalic acid, malic acid and maleic acid, polycarboxylates, homopolymers or copolymers of poly(acrylic acid) and poly (maleic acid) and the partial-ammonium or sodium salts thereof.

Examples of various chelating agents and treatment solutions that may have applicability to the single-stage treatment of sandstone formations include those described in U.S. Pat. Nos. 6,924,255 and 7,192,908, which is herein incorporated by reference in its entirety for all purposes.

In both non-mud-acid and mud-acid treatment fluids, the chelating agent may have a sufficient solubility in the treatment fluid to keep at least about 5000 ppm calcium ions in solution, more particularly at least about 10,000 ppm calcium ions, and still more particularly at least about 20,000 ppm calcium ions in solution.

It should be noted that the description and examples are presented herein solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the description, each numerical value should be read once as modified by the term "about" (unless already expressly so modified), and then read again as not so modified unless otherwise indicated in context. Also, in the description, it should be understood that a concentration or value listed or described as being useful, suitable, or the like, is intended that any and every concentration or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that the inventors appreciate and understand that any and all data points within the range are to be considered to have been specified, and that the inventors are in possession of the entire range and all points within the range.

The chelating agent may be used in an amount of from about 5% to about 40% by weight of the treating fluid. In certain embodiments, the amount of the chelating source may be from about 15% to about 30% by weight of the treating fluid, and more particularly, from about 20% to about 25% by weight of the treating fluid. These amounts may vary depending upon the amount of $Ca^{2+}$ that is kept in solution.

The hydrofluoric acid (HF) used in the treatment fluid may be hydrofluoric acid itself or may be selected from a hydrofluoric acid source, such as an ammonium fluoride salt, for example, ammonium fluoride and/or ammonium bifluoride or mixtures of these. The HF source may also be one or more of polyvinylammonium fluoride, polyvinylpyridinium fluoride, pyridinium fluoride, imidazolium fluoride, sodium tetrafluoroborate, ammonium tetrafluoroborate, salts of hexafluoroantimony, TEFLON® synthetic resinous fluorine-containing polymer, and mixtures of these. The hydrofluoric acid source must be water soluble.

The amount of the hydrofluoric acid source used should provide less than about 2% fluorine ($F^-$) by weight of the treatment fluid, including any fluorine in the treatment fluid that may be provided in solution from other fluorine sources. In certain embodiments, the fluorine may be present in an amount of 1.5% or 1% or less by weight of the treatment fluid. This low amount of fluorine facilitates limitation of precipitation of $CaF_2$.

The amount of sodium ($Na^+$) from any sodium source should also be limited within the treatment fluid to about 2% or less by weight of the treatment. In certain embodiments, the amount of sodium may be from about 1.5% or 1% or less by weight of the treatment fluid. Limiting the amount of sodium ions controls the precipitation of sodium fluoride (NaF).

In the treatment fluids of the invention, a Bronsted acid or proton donor is used. The Bronsted acid, as described previously, is any compound having the formula $AH=A^-+H^+$ when added to water. This material provides fines stability. Various acids may be used. These may include HCl, HF, organic acids, sulfamic acid, sulfonic acid, phosphonic acid, phosphoric acid, an ammonium salt, an ammine salt, a chelate acid and combinations thereof. Those Bronsted acids that provide ammonium ions may be particularly useful in many applications. Typically, the Bronsted acid will be present in the treatment fluid in an amount of from about 2% to about 20% by weight of the treatment fluid. The Bronsted acid may be used in an amount to provide or adjust the treatment fluid to the desired pH level. If the Bronsted acid is HF, the HF should provide no more than 2% by weight of any fluoride.

Other additives or components may be used with the treatment fluid. Corrosion inhibitors may also be added to the treatment fluids. Conventional corrosion inhibitors may be used as long as they are compatible with chemicals present in, or generated during use by, the treatment fluid. Those compounds containing ammonium quaternary moieties and sulfur compounds may be suitable (see for example U.S. Pat. No. 6,521,028) for this purpose.

Friction reducers, clay control additives, wetting agents, fluid loss additives, emulsifiers, agents to prevent the formation of emulsions, foaming agents, scale inhibitors, fibers, breakers and consolidating materials may also be used in the treatment fluid. It is to be understood that whenever any additives are included, laboratory tests may be performed to ensure that the additives do not affect the performance of the fluid.

In treating the formation or well to create flow paths in the formation or to remove wellbore coatings and near-wellbore formation damage, the treatment fluid with the hydrofluoric acid or HF source, Bronsted acid and chelating agent is introduced into the formation through the wellbore. Depending upon the formation temperature, which may range from about 200° C. or less, different treatment fluids may be used. For temperatures of from about 100° C. to about 200° C., the non-mud-acid treatment fluid employing the free acid form or ammonium or sodium salt of chelating agents in solution with an HF-source may be used with pH's of 4 or more. For lower temperatures of about 125° C. or less, the mud-acid formulations with a pH of from about 4 or 3 or less may be used. The well may then shut in to facilitate dissolution of the formation materials or well damage.

In certain applications, diversion of the treatment fluid may be necessary. When reservoirs with different zones of permeability are treated with the acid, the acid may flow into the high permeability zones and not stimulate the low permeability zones. To treat the low permeability zones, it may be necessary to divert the treatment fluid from high to low permeability zones. Diversion may be facilitated by a number of techniques. These may include the use of ball sealers or other diversion materials. Particulate materials that are subsequently removable, such as by dissolution and the like, may also be used. Examples of such particulates include rock salt, benzoic acid, oil-soluble-resin, etc. These materials may be introduced into the formation through the wellbore prior to introduction of the acid treatment fluid or with the treatment fluid itself. When the diversion materials are used with the treatment fluid, the fluid is pumped at a rate to penetrate the matrix of the rock without producing fractures where the fluid would be lost.

Diversion may also be achieved through the use of viscosified fluids. Such viscosified fluids may be those aqueous fluids that are thickened or gelled through the use of polymers or viscoelastic surfactants (VES) typically used in fracturing, frac-packing and gravel packing and the like. Such fluids are well known in the art. The VES may be selected from the group consisting of cationic, anionic, zwitterionic, amphoteric, nonionic and combinations thereof. Some non-limiting examples are those cited in U.S. Pat. No. 6,435,277 (Qu et al.)

and U.S. Pat. No. 6,703,352 (Dahayanake et al.), each of which are incorporated herein by reference.

Foamed or energized fluids may also be used for diversion. These may be the thickened or gelled fluids previously described or other aqueous fluid. The foaming agent may include air, nitrogen or carbon dioxide. See, for example, U.S. Pat. No. 3,937,283 (Blauer et al.), incorporated herein by reference. Foaming aids in the form of surfactants or surfactant blends may be incorporated in the foamed fluid.

In certain applications, the treatment fluid may also be incorporated into a self-diverting fluid. Viscoelastic surfactants have been used at a low concentration that does not generate significantly increased viscosity in such applications and have been disclosed, for instance, in U.S. Pat. No. 7,299,870, which is herein incorporated by reference. By the addition of the treatment fluid components, in similar quantities to those previously described, into such VES fluids a self-diverting acid treatment fluid or viscoelastic diverting acid (VDA) may be formed.

The follow examples serve to further illustrate the invention.

EXAMPLES

Example 1

Figure 2:
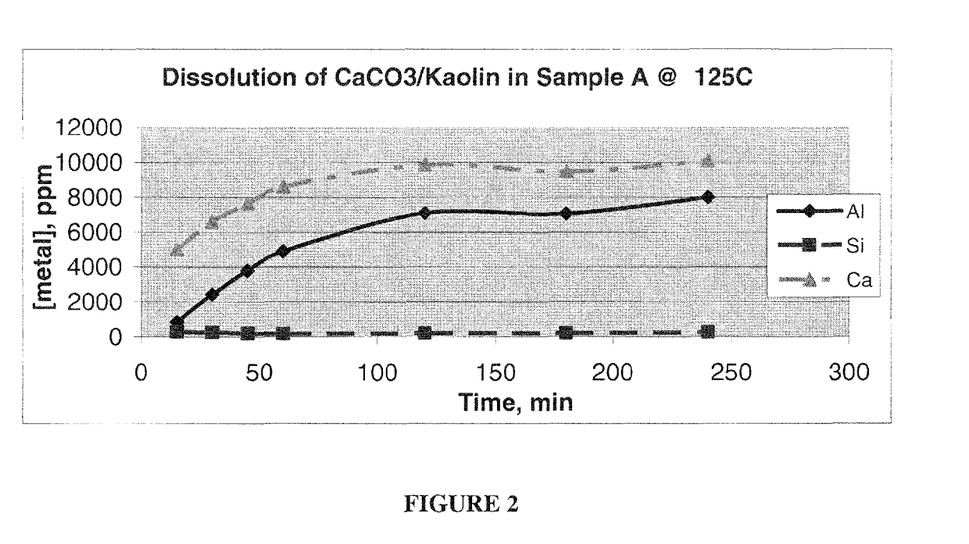
FIG. 2 shows a plot of the metal ion concentration over time of a calcite/kaolin mineral treated with a treatment solution (Sample A) from Example 1 at 125° C.

Slurry reactor tests were conducted on mineral solids composed of 20 g of calcite and 50 g kaolin. The minerals were crushed in a plastic bag, and then ground to a fine powder using a mortar and pestle. These mineral samples were then treated using a slurry reactor, available from Parr Instrument Company, Moline, Ill., which includes a 4500 series Parr pressure reactor with a capacity of 1 L of fluid. In each test, the fluid in the reactor was stirred at 100 rpm using a 4 bladed impeller driven by a magnetic drive-coupled electric motor. The cell was fitted with a 4" dip tube to enable the acquisition of samples on a timed basis. The cell was also fitted with a backpressure regulator, which was set at 200 psi (1380 kPa). The reactor cell and internal parts were constructed of Hastelloy B. The solid mineral was placed into a Teflon cup which was fitted to the inside of the reactor cell. The cell was then sealed and heated to the desired reaction temperature. Separately, the treatment fluid solution was pumped into an accumulator housing and was heated separately to the desired temperature. When both chambers were at the test temperature, the test fluid was transferred to the chamber containing the stirred clay (at 100 rpm) and the test time was started. The tests were typically carried out for 4 hours. Fluid samples were collected at targeted intervals throughout the experiment, were filtered through 0.2 μm filters, and were diluted with deionized water for ICP analysis. The concentrations of dissolved aluminum and calcium resulting from efficient clay/carbonate dissolution were measured in each of those samples using a Perkin-Elmer Optima 2000 DV inductively coupled plasma (ICP) optical emission spectrometry instrument. The residual solids at the end of the experiment were rinsed, filtered, and analyzed using a Rigaku Miniflex X-ray Diffractometer (XRD). The resulting XRD spectra were qualitatively compared to a library of standards using the Jade software package (Rigaku) to determine the reaction byproducts. The treatment fluid had a pH of about 4.5 and was composed of diammonium ethylenediamine tetraacetic acid (DAE) at 50 wt % (received as 45% active) and 1 wt % of ammonium bifluoride (Sample A). FIG. 2 shows the concentration of the metal ions for Al, Si and Ca over time, as determined by ICP analysis. The treatment fluid Sample A dissolved a large amount of calcium and clay (as indicated by [Al]) but did not precipitate $CaF_2$, as determined by X-ray diffraction (XRD). XRD analysis showed the presence of calcium silicate, but no calcite or fluorite.

Example 2 (Comparative)

Figure 3:
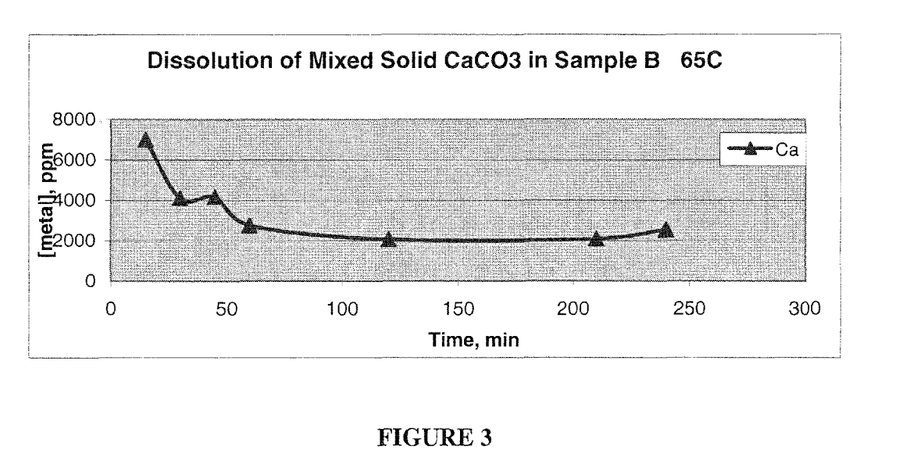
FIG. 3 shows a plot of the metal ion concentration over time of a calcite mineral treated with a treatment solution using citric acid (Sample B) from Example 2 at 65° C.

Slurry reactor tests were conducted on mineral solids composed of 70 g of calcite, as in Example 1. The minerals were treated at 65° C. with 620 g of an aqueous treatment fluid (Sample B). The treatment fluid Sample B was composed of 13 wt % citric acid, 4 wt % HCl, 5 wt % ammonium bifluoride and 2.5 wt % boric acid. The pH of Sample B was less than 3. FIG. 3 shows the calcium ion concentration for Sample B, as determined by ICP analysis, showing that the calcium concentration drops even in the absence of clay. This indicates that citric acid is not a good solvent for calcium carbonate compared with DAE, as in Example 1.

Example 3

Figure 4:
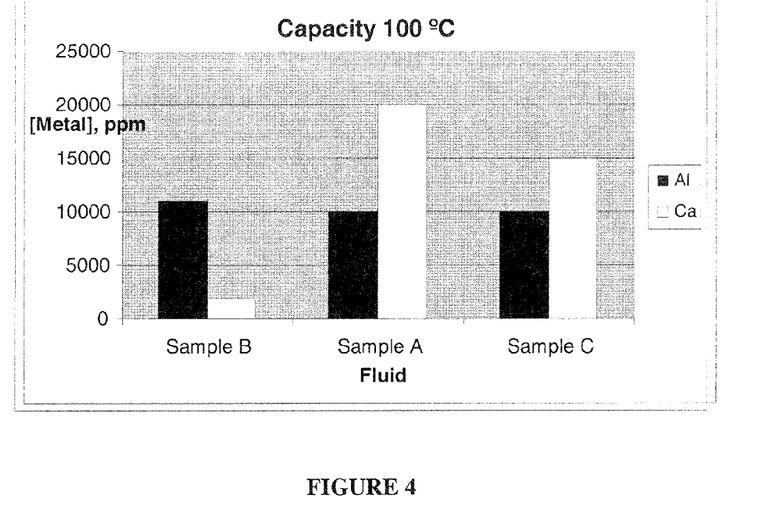
FIG. 4 shows the final Ca and Al ion concentration for Samples A-C, wherein Sample C has a different DAE/ammonium bifluoride concentration from that of Sample A.

Three tests using Sample A, Sample B and a solution of 25 wt. % DAE (received as 45% active) with 1 wt. % ammonium bifluoride (Sample C). These three fluids were used in the slurry reactor consisting of mixtures of kaolinite and calcite at 100° C. The maximum capacities for the fluids to dissolve the clay and calcite were determined from the final concentration of Al and Ca in solution after a 6 hour test. FIG. 4 is a summary of test results using Samples A-C. These are based on $CaCO_3$/kaolinite tests at 125° C. They show that all three formulations dissolved clay (See Al conc.) but the DAE and ammonium bifluoride solutions (Samples A and C) dissolved much more calcite.

Example 4

Figure 5:
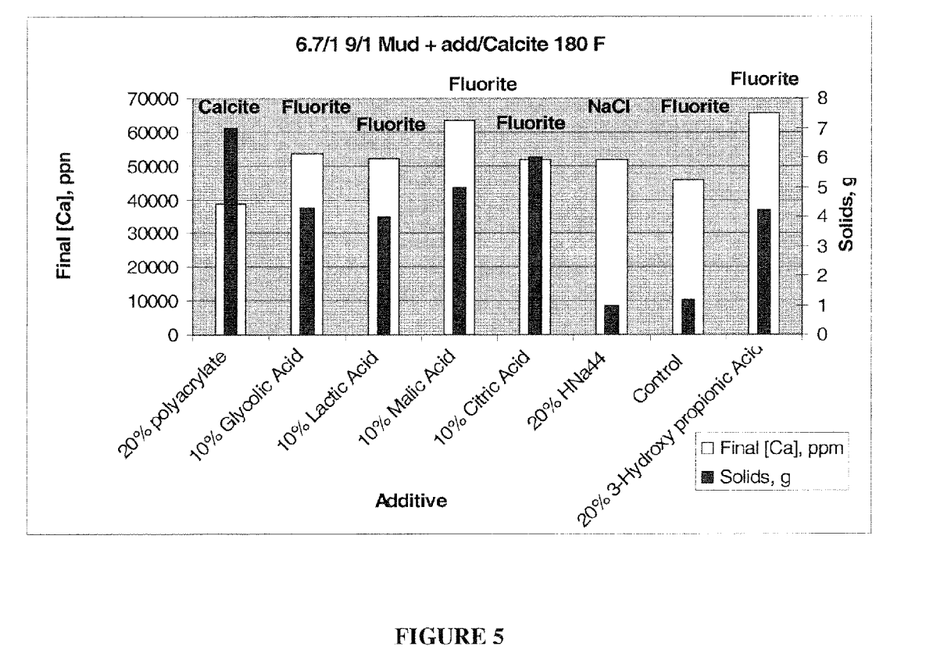
FIG. 5 shows the final concentration of various precipitates for various chelating agents used in mud-acid treatment fluids in treating calcite.

Mud acid treatment fluids were prepared with a 9/1 mud acid composed of 9 wt % HCl and 1 wt % HF that was formed adding ammonium bifluoride. The mud acid treatment fluids had a pH<1. Various amounts of chelating agents (~8-20% (w/w), as shown in FIG. 5) were added to the mud acid formulation to try to suppress the formation of $CaF_2$. This testing was carried out as a series of shaker-bath tests, modified from the experimental procedures used in Examples 1-3. In the shaker bath tests, a water bath with a tray subjected to shaken-agitation was set to slightly above the set reaction temperature. In separate 150 mL plastic containers, 10 grams calcium carbonate was combined with 68 grams of the candidate fluid and was subjected to heated agitation for a period of 4 hours. The test consisted of completely spending the formulation on calcite at 180° F. (82.2° C.). In all cases, the amount of liquid in the formulation was reduced by the amount of the chelate added so as to not dilute the acid. FIG. 5 shows the results. The wide bar is the concentration of Ca in solution and the narrow bar is the amount of solids formed and the identification. The only chelate to completely suppress formation of $CaF_2$ was monosodium HEDTA added at 8.8 wt % monosodium HEDTA. All of the other formulations gave some precipitation of $CaF_2$ or did not dissolve all of the calcite.

Example 5

Figure 6:
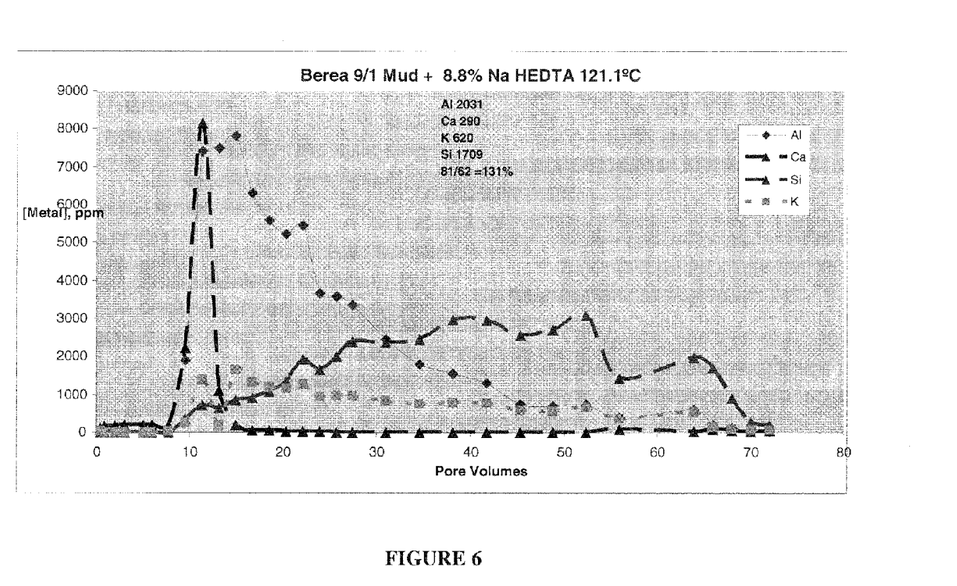
FIG. 6 shows the concentration of various metals during treatment of a Berea core sample for 9/1 mud acid containing monosodium HEDTA.

The treatment fluid of 9/1 mud acid+8.8 wt % of monosodium HEDTA chelating agent from Example 4 was used to treat Berea core samples at 250° F. (121.1° C.). The results are presented in FIG. 6. These coreflood experiments used Berea sandstone cores (1" (2.54 cm) diameter) in a Formation Response Tester Instrument. The cores were tested at 250° F. (121.1° C.) under a confining pressure of 2000 psi (13,780 kPa) in a Viton sleeve. A backpressure of 500 psi (3,447 kPa) was used to keep $CO_2$ in solution, allowing accurate measurement of the differential pressure (top to bottom) across the core. After the brine-saturated core has reached temperature, the initial permeability to 5% $NH_4Cl$ brine (k-ini) was measured separately in the production and injection directions from the differential pressure that is measured across the core [ΔP(ini)] by Darcy's law, familiar to those skilled in the art. In each test, 70 pore volumes (PV) of treatment fluid were subsequently pumped through the core in the downward injection at 5 mL/min ("injection direction"). During the treatment stage, samples of the effluent during injection of each pore-volume were collected and were later analyzed using inductively-coupled plasma (ICP) optical emission spectrometry. Following the treatment stage, the return permeability to 5% $NH_4Cl$ was measured in the production and injection directions to determine the final permeability ($k_{fin}$) In both cases the concentrations of the effluents were plotted versus # of injected pore-volumes and the inset box of FIG. 6 shows the cumulative (mg) of metal removed. In the case of the solution of 9/1 Mud Acid+8.8% monosodium HEDTA, the core treatment led to a permeability ratio (k-fin/k-ini, shown in FIG. 6 as 81/62) of 131%, a 31% stimulation of the core permeability. The ICP trace in FIG. 6 indicates first rapid generation of dissolved calcium, which would not occur in the case of fluorite precipitation. Additionally, the high concentrations of aluminum and silicon indicate efficient aluminosilicate dissolution under these experimental conditions.

Example 6

Figure 7:
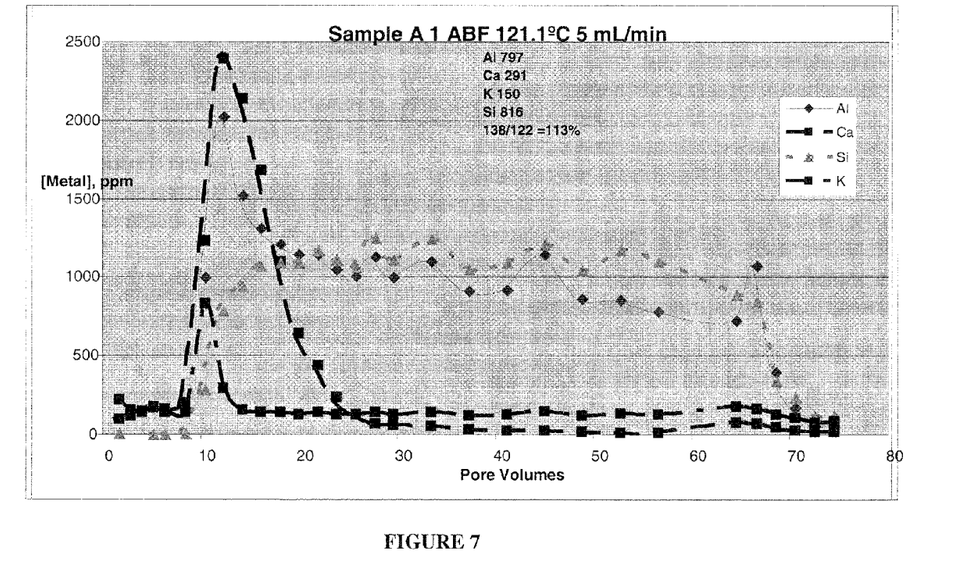
FIG. 7 shows the concentration of various metals during treatment of a Berea core sample for a DAE and ammonium bifluoride treatment fluid.

A treatment fluid containing 50% by weight of DAE (45% active) and 1% by weight ammonium bifluoride (ABF) was used to treat Berea core sample at 250° F. (121.1° C.). This fluid stimulated the core and removed significant amounts of Ca and Al. The results are presented in FIG. 7. In that data, a high calcium concentration is initially achieved, and a prolonged dissolution of aluminosilicates (seen in the high aluminum, silicon concentrations in the effluent), indicative of the simultaneous dissolution of clays and calcite. This simultaneous dissolution is critical for the execution of a chelating agent/HF/Bronsted acid fluid as a simplified acid into a sandstone reservoir. Further, FIG. 7 shows a 13% stimulation of the core permeability after treatment.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

Although the methods have been described here for, and are most typically used for, hydrocarbon production, they may also be used in injection wells and for production of other fluids, such as water or brine. The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:
1. A method of treating a sandstone-containing formation penetrated by a wellbore, the method comprising:
   forming a treatment fluid comprising an aqueous fluid containing a Bronsted acid, a hydrogen fluoride source and an organic acid or salt thereof that is substantially soluble in the aqueous fluid, the fluid containing less than about 2% of fluoride ($F^-$) by weight of the fluid and from 2% or less of sodium ($Na^+$) by weight of the fluid; and,
   introducing the treatment fluid into the formation through the wellbore as a single-stage without introducing an acid-containing fluid preflush into the formation prior to introducing the treatment fluid;
   wherein the combination of Bronsted acid/organic acid or salt thereof is present in the treatment fluid in an amount sufficient to keep at least 5000 ppm $Ca^{2+}$ in solution.
2. The method of claim 1, wherein the organic acid or salt thereof is a chelating agent.
3. The method of claim 1, wherein the treatment fluid has a pH of about 3 or less.
4. The method of claim 1, wherein the Bronsted acid is selected from at least one of HCl, an organic acid, a sulfamic acid, a sulfonic acid, a phosphoric acid, a phosphonic acid, an ammonium salt, an ammine salt, a chelate acid and combinations thereof.
5. The method of claim 1, wherein the organic acid or salt thereof is an ammoniated chelate.
6. The method of claim 1, wherein the organic acid or salt thereof is selected from at least one of ethylenediamine tetraacetic acid (EDTA), hydroxyethyl ethylenediamine triacetic acid (HEDTA), diethylene triamine pentaacetic acid (DTPA), 2-hydroxyethyl iminodiacetic acid (HEIDA), citric acid, tartaric acid, succinic acid, lactic acid, oxalic acid, malic acid and maleic acid, polycarboxylates, homopolymers or copolymers of poly(acrylic acid) and poly(maleic acid) and the partial-ammonium or sodium salts thereof.
7. The method of claim 1, wherein the hydrogen fluoride source is selected from at least one of hydrofluoric acid, ammonium fluoride, ammonium bifluoride, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers, and combinations of these.
8. The method of claim 1, wherein the organic acid or salt thereof is present in an amount of from about 5 to about 40% by weight of the treatment fluid.
9. The method of claim 1, wherein the treatment fluid is introduced into the formation through the wellbore as a single-stage without introducing a brine-containing fluid preflush into the formation prior to introducing the treatment fluid.
10. The method of claim 1, wherein the treatment fluid is used at a temperature of from 200° C. or less.
11. A method of treating a sandstone-containing formation penetrated by a wellbore, the method comprising:
   forming a treatment fluid comprising an aqueous fluid containing a Bronsted acid, a hydrogen fluoride source and an organic acid or salt thereof that is substantially soluble in the aqueous fluid, the fluid containing less than about 2% of fluoride (F−) by weight of the aqueous fluid and from 2% or less of sodium (Na+); and wherein the treatment fluid is introduced as a single-stage treatment without introducing a brine-containing or acid-containing fluid preflush into the formation prior to introducing the treatment fluid;

wherein the combination of Bronsted acid/organic acid or salt thereof is present in the treatment fluid in an amount sufficient to keep at least 5000 ppm $Ca^{2+}$ in solution.

12. The method of claim 11, wherein the organic acid or salt thereof is a chelating agent.

13. The method of claim 11, wherein the treatment fluid has a pH of about 3 or less.

14. The method of claim 11, wherein the Bronsted acid is selected from at least one of HCl, an organic acid, a sulfamic acid, a sulfonic acid, a phosphoric acid, a phosphonic acid, an ammonium salt, an ammine salt, a chelate acid and combinations thereof.

15. The method of claim 11, wherein the organic acid or salt thereof is an ammoniated chelate.

16. The method of claim 11, wherein the organic acid or salt thereof is selected from at least one of ethylenediamine tetraacetic acid (EDTA), hydroxyethyl ethylenediamine triacetic acid (HEDTA), diethylene triamine pentaacetic acid (DTPA), 2-hydroxyethyl iminodiacetic acid (HEIDA), citric acid, tartaric acid, succinic acid, lactic acid, oxalic acid, malic acid and maleic acid, polycarboxylates, homopolymers or copolymers of poly(acrylic acid) and poly(maleic acid) and the partial-ammonium or sodium salts thereof.

17. The method of claim 11, wherein the hydrogen fluoride source is selected from at least one of hydrofluoric acid, ammonium fluoride, ammonium bifluoride, fluoroboric acid, hexafluorophosphoric acid, difluorophosphoric acid, fluorosulfonic acid, polyvinylammonium fluoride, polyvinylpyridinium fluoride, pyridinium fluoride, imidazolium fluoride, sodium tetrafluoroborate, ammonium tetrafluoroborate, salts of hexafluoroantimony, polytetrafluoroethylene polymers, and combinations of these.

18. The method of claim 11, wherein the organic acid or salt thereof is present in an amount of from about 5 to about 40% by weight of the treatment fluid.

* * * * *